(12) United States Patent
Amma

(10) Patent No.: US 6,400,256 B2
(45) Date of Patent: *Jun. 4, 2002

(54) COMMUNICATION APPARATUS CAPABLE OF DISPLAYING SIMULTANEOUSLY THE LATEST MESSAGES RECEIVED FROM A PLURALITY OF CALLERS

(75) Inventor: Sadayuki Amma, Shizuoka (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,638

(22) Filed: May 29, 1998

(30) Foreign Application Priority Data

Jun. 4, 1997 (JP) .............................. 9-146418

(51) Int. Cl.[7] ................................ H04Q 7/00
(52) U.S. Cl. ...................... 340/7.46; 340/7.2; 340/7.47; 340/7.52; 340/7.53; 379/88.2
(58) Field of Search ....................... 340/825.44, 825.69, 340/825.72, 825.47, 311.1, 7.2, 7.46; 455/38.1, 32.1, 38.2; 379/88.2, 142, 199

(56) References Cited

U.S. PATENT DOCUMENTS

| | | | | |
|---|---|---|---|---|
| 4,924,496 A | * | 5/1990 | Figa et al. .................. 379/142 |
| 5,265,145 A | * | 11/1993 | Lim .......................... 379/88.2 |
| 5,459,458 A | * | 10/1995 | Richardson et al. ... 340/825.52 |
| 5,602,908 A | * | 2/1997 | Fan ............................. 379/199 |
| 5,629,686 A | * | 5/1997 | Miyauchi ............... 340/825.44 |
| 5,629,688 A | * | 5/1997 | Muramatsu et al. ... 340/825.44 |
| 5,959,544 A | * | 9/1999 | Matsuura ............... 340/825.44 |
| 6,067,355 A | * | 5/2000 | Lim et al. .................... 379/142 |

FOREIGN PATENT DOCUMENTS

| | | |
|---|---|---|
| JP | 4-56532 | 2/1992 |
| JP | 4-357722 | 12/1992 |
| JP | 6-284073 | 10/1994 |

* cited by examiner

Primary Examiner—Brian Zimmerman
Assistant Examiner—Yves Dalencourt
(74) Attorney, Agent, or Firm—McGinn & Gibb, PLLC (57) ABSTRACT

A communication apparatus of the present invention displays, in its stand-by state, particular callers' name belonging to a preset group and the latest messages respectively corresponding to particular callers' names continuously on a display 6. On the receipt of a radio signal, a message conversion section 12 converts it to a received message. A comparison and controller 5 determines whether or not the converted message includes any one of the particular callers' names registered previously at a RAM (Random Access Memory) 8. If the answer of this decision is positive, the latest message corresponding to the particular caller's name and also stored in the RAM 8 is updated. Thereafter, a group name to which the particular caller's name belongs, all of the particular callers' names belonging to the group and the latest messages respectively corresponding to all of the particular callers' names are displayed on the display 6.

35 Claims, 9 Drawing Sheets

| | ROW | | | | | | | | | |
|---|---|---|---|---|---|---|---|---|---|---|
| COLUMN | | 1 | 2 | 3 | 4 | 5 | 6 | 7 | 8 | 9 | 0 |
| | 1 | ア(A) | イ(I) | ウ(U) | エ(E) | オ(O) | A | B | C | D | E |
| | 2 | カ(KA) | キ(KI) | ク(KU) | ケ(KE) | コ(KO) | F | G | H | I | J |
| | 3 | サ(SA) | シ(SI) | ス(SU) | セ(SE) | ソ(SO) | K | L | M | N | O |
| | 4 | タ(TA) | チ(TI) | ツ(TU) | テ(TE) | ト(TO) | P | Q | R | S | T |
| | 5 | ナ(NA) | ニ(NI) | ヌ(NU) | ネ(NE) | ノ(NO) | U | V | W | X | Y |
| | 6 | ハ(HA) | ヒ(HI) | フ(HU) | ヘ(HE) | ホ(HO) | Z | ? | ! | − | / |
| | 7 | マ(MA) | ミ(MI) | ム(MU) | メ(ME) | モ(MO) | ¥ | & | ◷ | ☎ | ☕ |
| | 8 | ヤ(YA) | ( | ユ(YU) | ) | ヨ(YO) | * | # | SP | SP | ♥ |
| | 9 | ラ(RA) | リ(RI) | ル(RU) | レ(RE) | ロ(RO) | 1 | 2 | 3 | 4 | 5 |
| | 0 | ワ(WA) | ヲ(WO) | ン(N) | ゛ | ゜ | 6 | 7 | 8 | 9 | 0 |

| GROUP | NO. | CALLER'S NAME | LATEST MESSAGE |
|---|---|---|---|
| A | 1 | BOB-- | CALL ME |
| | 2 | MARY-- | NEW YORK NOW |
| | 3 | NANCY | COMPANY |
| | 4 | TOM-- | DON'T CALL ME |
| B | 1 | TARO-- | PHONE OK |
| | 2 | MIKA-- | HOME |
| | 3 | TOSHI | LET'S PLAY |
| | 4 | KEN-- | CALL ME |
| C | 1 | BALL 1 | Mets 5-5 Dodgers |
| | 2 | BALL 2 | Angels 1-3 Yankees |
| | 3 | SOCCE | US 2-1 JPN |
| | 4 | VOLLE | JPN 14-3 RUSSIA |

4A

| NO. | MESSAGE |
|---|---|
| 1 | MEETING TOMORROW |
| 2 | FREE NOW? |
| 3 | CALL ME |
| 4 | COME TO A AT 18:00 |
| 5 | GOOD MORNING |
| 6 | CALL ME |
| 7 | CALL TOM |
| ---------- | ---------- |
| 50 | FREE TOMORROW |

| NO. | MENU |
|---|---|
| 01 | MEMO |
| 02 | SETTING DISPLAY |
| 03 | SETTING ALARM |
| 04 | SETTING CALLER'S NAME |
| 05 | SETTING TIME |

COMMUNICATION APPARATUS CAPABLE OF DISPLAYING SIMULTANEOUSLY THE LATEST MESSAGES RECEIVED FROM A PLURALITY OF CALLERS

BACKGROUND OF THE INVENTION

1. Field of the Invention

The present invention relates to a communication apparatus capable of displaying messages.

2. Description of the Related Art

Today, radio pagers allow a plurality of callers to send messages, e.g., "New York now." and "Phone OK." in order to report each other's situations frequently. However, the conventional radio pagers each can display only a single received message on its display at a time, i.e., cannot display simultaneously the latest messages received from a plurality of particular callers selected beforehand. This prevents the user of each radio pager from recognizing the situations of a plurality of callers immediately. Moreover, when the user desires to see the latest messages received from particular callers, the user must see them one by one on the display, resulting in inefficient operation.

SUMMARY OF THE INVENTION

It is therefore an object of the present invention to provide a communication apparatus capable of allowing the user of the apparatus to see the situations of a plurality of particular callers at a glance.

It is another object of the present invention to provide a communication apparatus enhancing efficient operation.

In accordance with the present invention, a communication apparatus includes a receiving section for receiving a signal including first information representative of a caller's name, a storage for storing second information representative of a caller's name, a comparison and control section for determining whether or not the first information and second information are identical, and a display for displaying, when the first information and the second information are identical, the first information and a message included in the signal received.

Also, in accordance with the present invention, a communication apparatus includes a controller for grouping messages respectively received from a plurality of callers, and a display for displaying the messages grouped by the controller in a single picture.

Further, in accordance with the present invention, a display method for a communication apparatus includes setting first information representative of a caller's name, receiving a signal including second information representative of a caller's name, determining whether or not the first information and second information are identical, and displaying, when the first information and second information are identical, the second information and a message included in the signal received.

Moreover, in accordance with the present invention, a display method for a communication apparatus, includes setting first information representative of a caller's name, grouping and storing a plurality of first information, receiving a signal including second information representative of a caller's name, determining whether or not the second information and any one of the first information are identical, and displaying, when the second information and any one of the second information are identical, a plurality of first information and messages respectively corresponding to the plurality of first information in a single picture.

BRIEF DESCRIPTION OF THE DRAWINGS

The above and other objects, features and advantages of the invention will become more fully apparent from the following detailed description taken in conjunction with the accompanying drawings in which.

DETAILED DESCRIPTION OF THE PREFERRED EMBODIMENT

Figure 1:
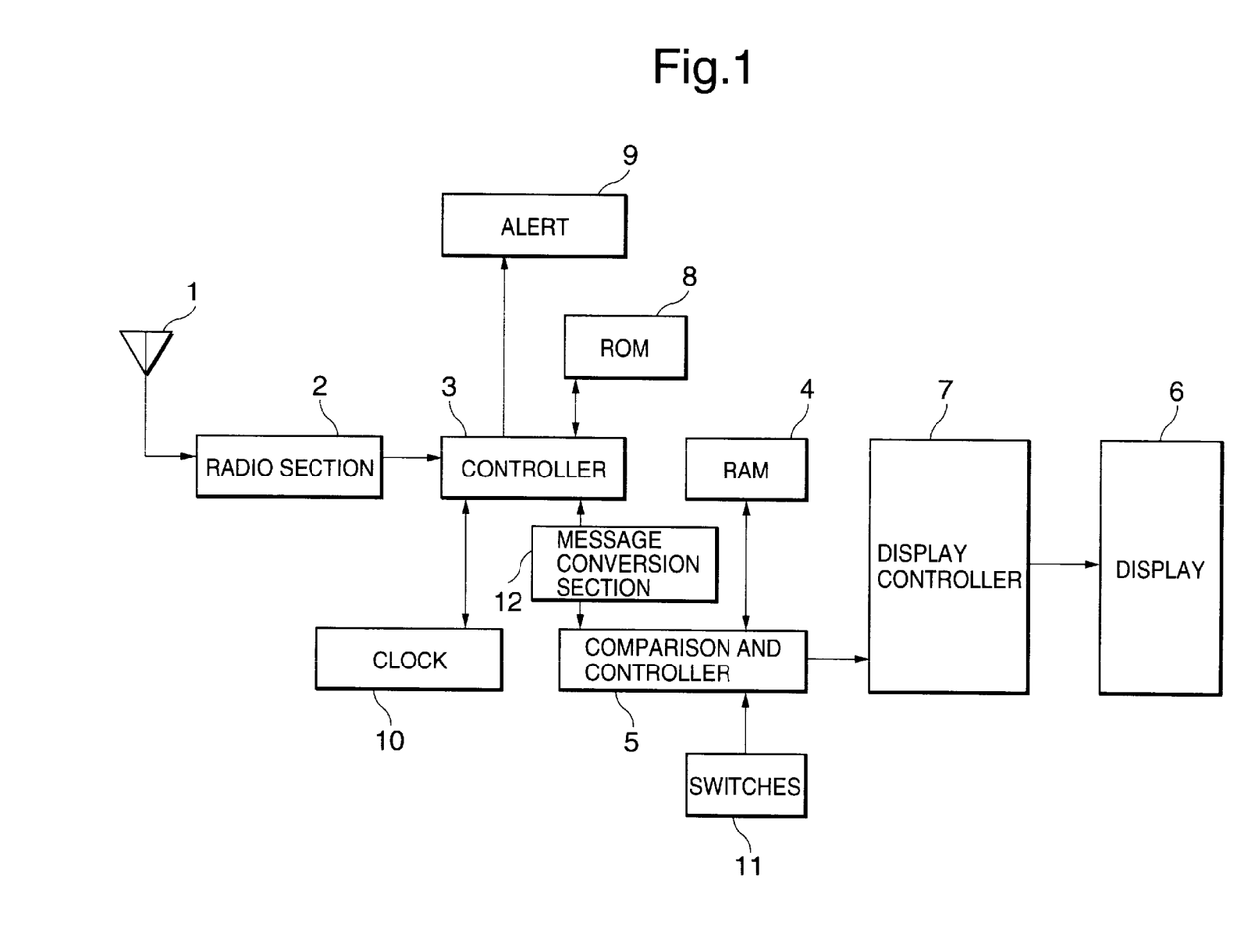
FIG. 1 is a preferred block diagram schematically showing a communication apparatus embodying the present invention.

Referring to FIG. 1 of the drawings, a communication apparatus embodying the present invention is shown and implemented as a radio pager by way of example. As shown, the pager includes a radio section 2 connected to an antenna 1. The radio section 2 amplifies and demodulates a radio signal coming in through the antenna 1 from a base station (not shown) and having, e.g., a POCSAG format. The demodulated signal is output from the radio section 2 in the form of a wave-shaped digital signal. A controller 3 compares an address number included in the received signal with an address number stored in a ROM (Read Only Memory) 8 beforehand. If the two address numbers compare equal, then the controller 3 controls an alert 9 in order to report the call incoming to the user of the pager. The alert 9 may advantageously be implemented as at least one of a speaker, an LED (Light Emitting Diode), and a vibrator.

The controller 3 delivers message data also included in the received signal to a message conversion section 12. The message conversion section 12 sequentially converts a train of character codes included in the received signal to characters for display by using a message conversion table such as one shown in FIG. 2. A RAM 4 is used to store a group number, particular callers' names belonging to a group designated by the group number, and the latest messages respectively received from the particular callers. The particular callers' names and received messages are related one-to-one to each other. A comparison and controller 5 determines whether or not a predetermined number of characters heading the message data, e.g., five characters are coincident with any one of the particular callers' names stored in the RAM 4. A predetermined number of characters heading the message data determining whether or not they are coincident is limited in five characters. If the answer of this decision is positive, then the comparison and controller 5 displays all of the callers' names of the group to which the coincident particular name belongs and latest messages respectively corresponding to the callers' names on a display 6 via a display controller 7. The display 6 may advantageously be implemented as a CRT (Cathode Ray Tube) or an LCD (Liquid Crystal Display). Switches 11 are operated by the user to register the particular callers names to be stored in the RAM 4, to stop alerting means, or to switch the display 6. A clock 10 feeds a clock to the controller 3.

Figure 3:
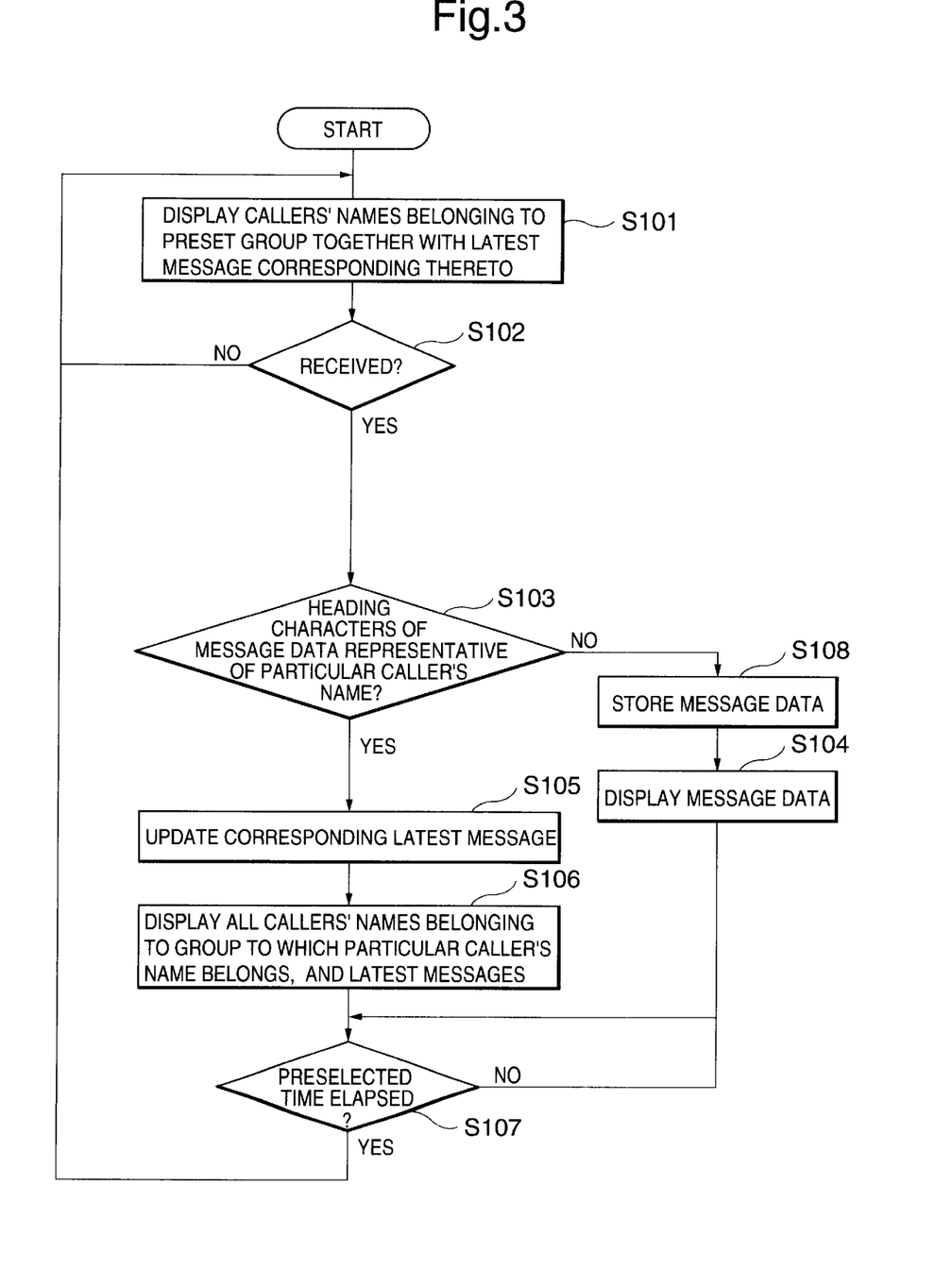
FIG. 3 is a flowchart demonstrating a preferred operation of the communication apparatus shown in FIG. 1.
Figure 4A:
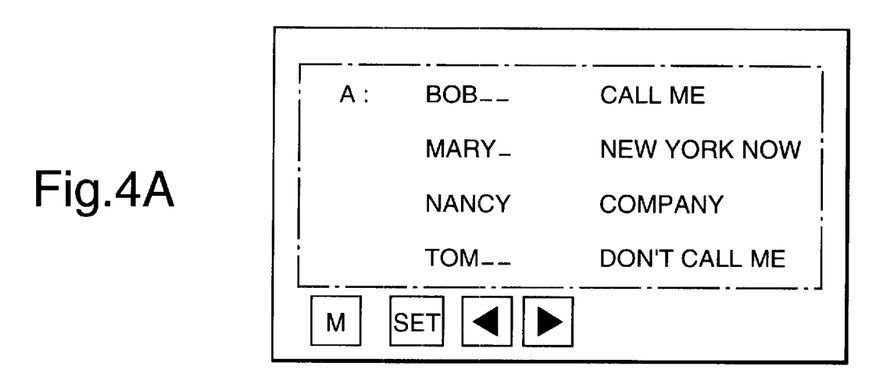
FIGS. 4A–4C show a preferred group number, preferred callers' names, and preferred latest messages appearing on a display shown in FIG. 1.
Figure 4B:
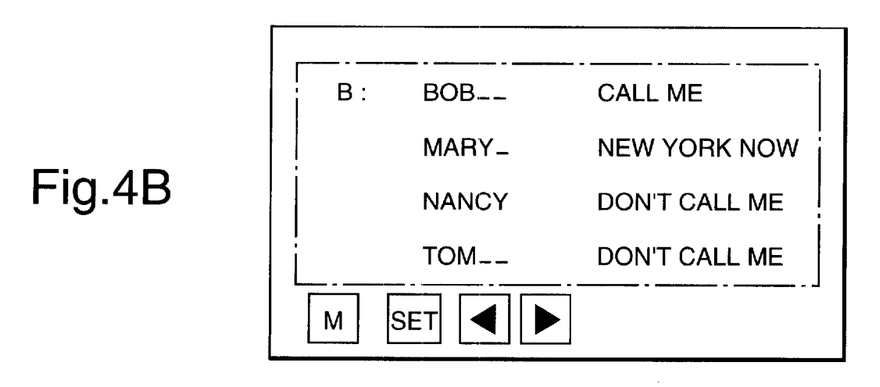
Figure 4C:
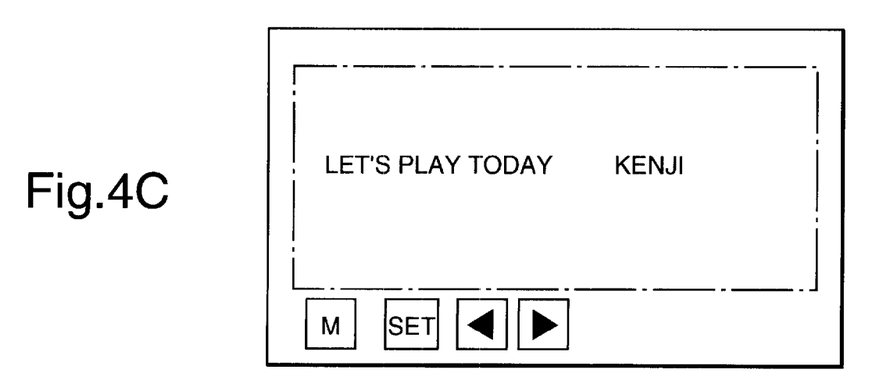
Figure 5:
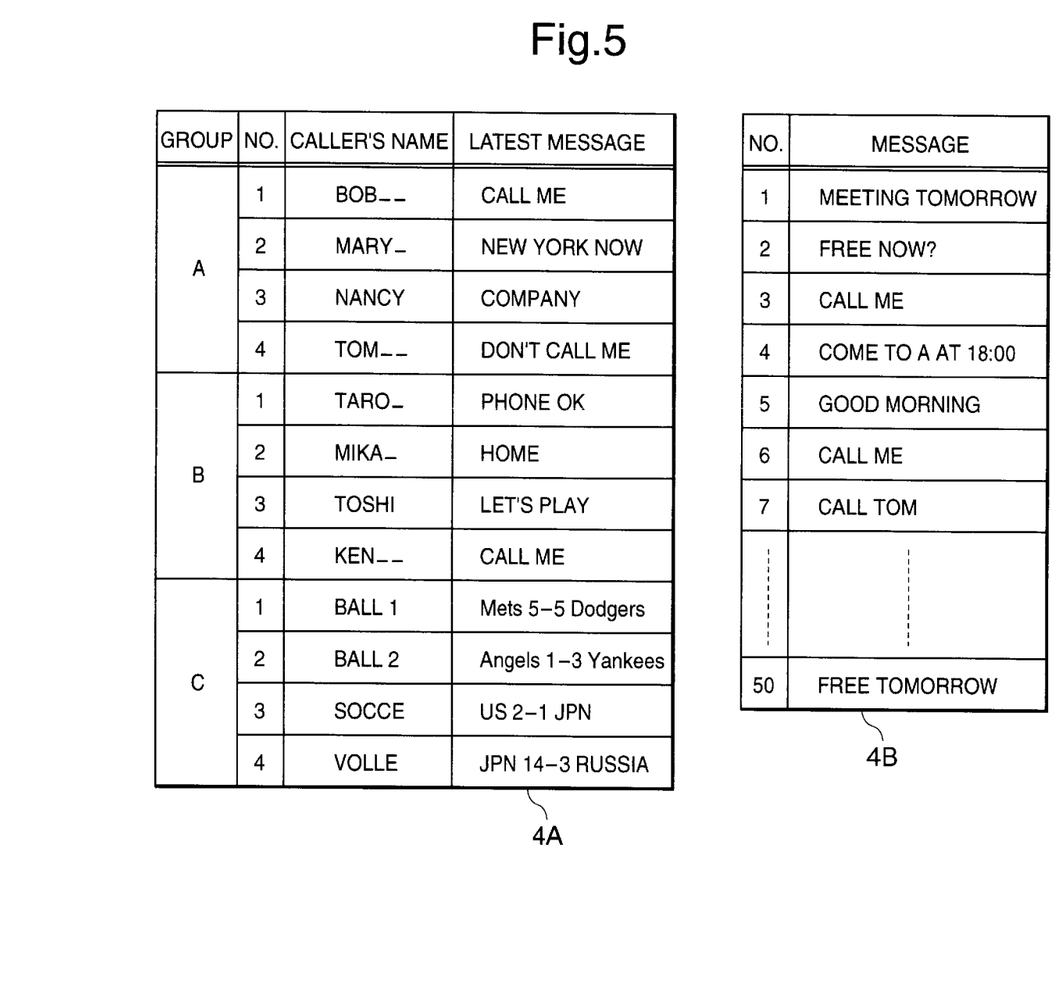
FIG. 5 shows a preferred table stored in a RAM (Random Access Memory) shown in FIG. 1 and storing group numbers, callers' names, and latest messages.

Reference will be made to FIGS. 3, 4A–4C and 5 for describing a preferred operation of the illustrative embodiment. FIGS. 4A–4C are plan views each showing the portion of the pager including the switches 11 and display 6 in a particular condition. FIG. 5 shows preferred messages stored in the RAM 4 in FIG. 1.

Figure 2:
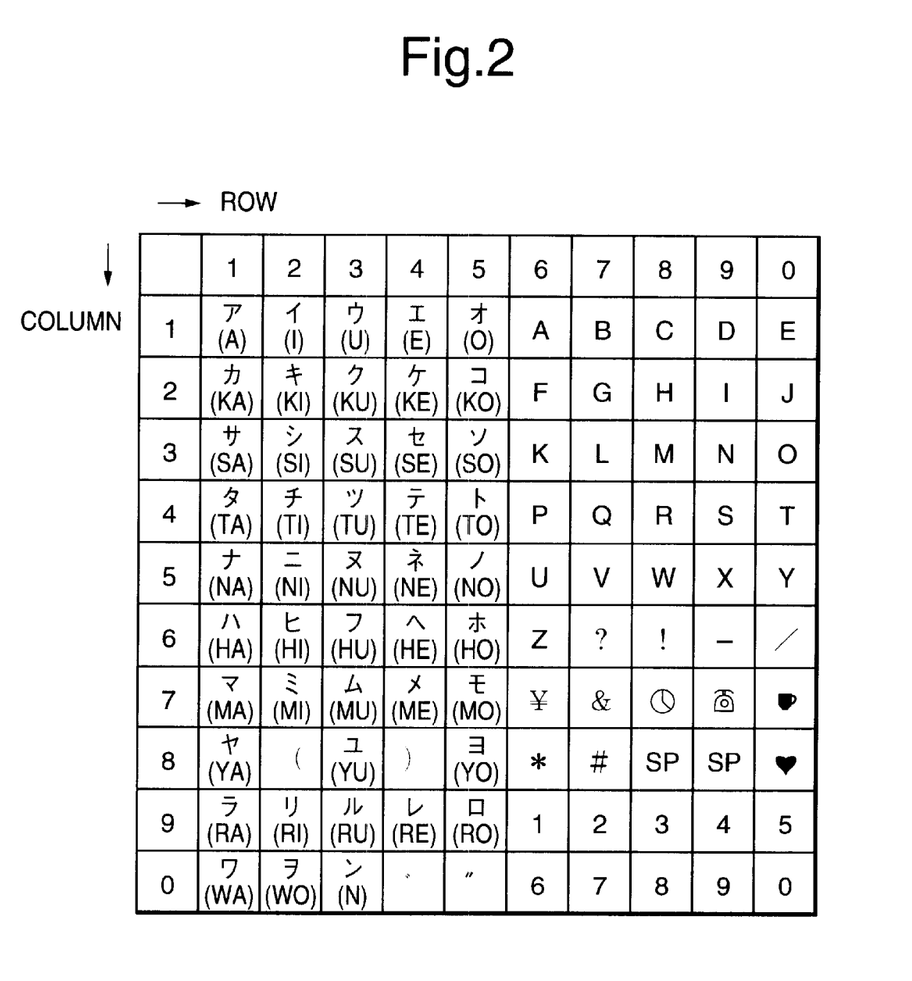
FIG. 2 shows a preferred message conversion table stored in a message conversion section shown in FIG. 1.

As shown in FIG. 3, when the user operates the switches 11 while the pager is in its stand-by state, the names of the particular callers belonging to a preset group, e.g., a group A and the latest messages respectively received from the particular callers initially appear on the display 6, as shown in FIG. 4A specifically (step S101). Then, whether or not a radio signal is received is determined (step S102). If the answer of the step S102 is positive (YES), then whether or not an address number included in the received signal is identical with the address number stored in the ROM 8 is determined. If the two address numbers are not identical, then the pager returns to the stand-by state. If the two address numbers are identical, then message data following the received address number are fed to the message conversion section 12. The message conversion section 12 converts consecutive character codes included in the message data to corresponding characters for display, i.e., a received message by use of the table of FIG. 2. The converted received message is fed from the message conversion section 12 to the comparison and controller 5. The comparison and controller 5 determines whether or not a preselected number of characters heading the received message, e.g., five characters are identical with any one of the particular callers' names registered previously at the RAM 4A shown in FIG. 4A (step S103). This decision should preferably be made by comparing the heading characters of the received message and the characters of each particular caller's name one by one. When the above characters are identical with each other (YES, step 103), the rest of the received message other than the heading characters representative of the caller's name, i.e., a true message is separated. The true message is written to a corresponding portion of the RAM 4A in place of the existing message, i.e., the message is updated (step S105). Then the message received previously is deleted. As a result, the name of the group to which the above particular caller's name belongs, all of the particular callers' names belonging to the group, and the latest messages respectively corresponding to all of the particular callers appear on the display 6, as shown in FIG. 4B specifically (step S106). FIG. 4B shows that the pager has received a message "Don't call me now." from "Nancy" (one of the particular callers belonging to the group A) and substituted it for the existing message "Company". Subsequently, whether or not a preselected period of time, e.g., 30 seconds have elapsed is determined (step S107). On the elapse of the preselected period of time (YES, step 107), the pager returns to the stand-by state and displays the latest messages of the preset group on the display 6 in the condition shown in FIG. 4A (step S101).

Assume that the heading characters of the received message is not identical with any one of the particular callers' names registered previously at the RAM 4 (NO, step S103). Then, the received message is simply written to the RAM 4B (step S108) and displayed on the display 6 alone, as shown in FIG. 4C specifically (step S104). On the elapse of a preselected period of time, the pager returns to the stand-by state and displays the latest messages of the preselected group on the display 6 in the condition shown in FIG. 4A (step S101).

Five characters, for example, heading the received message are compared with each of the particular callers' names registered previously at the RAM 4A, as stated earlier. Therefore, the particular callers' names short of five characters each is followed by a blank represented by a dash or dashes "-" making up for the shortage. FIG. 5 shows two RAMs 4A and 4B each for storing particular information. As shown, the particular callers's names stored in the RAM 4A are not limited to names, but may be represented by symbols or codes. The crux is that the calling person and called person be capable of identifying each other's name. For example, group C stored in the RAM 4A lists particular callers' names which are "BALL1" representative of BASEBALL1, "BALL2" representative of BASEBALL2, "SOCCE" representative of SOCCER, and "VOLLE" representative of VOLLEYBALL. By causing the pager to display a group C continuously, the user can see the results and interim reports of different games at a time. Of course, each group may include less than or more than four callers' names, e.g., only a single caller's name.

Messages received from callers other than the particular callers are sequentially written to the other RAM 4B in the order of receipt. When the number of such messages exceeds the maximum number e.g., 50 available with the RAM 4B, the messages are sequentially deleted, the oldest one being first. If desired, a flag, for example, may be used to protect an important message. Further, because only the latest messages received from the particular callers are written to the RAM 4A, old messages received from them may be written to the RAM 4B.

Referring to FIGS. 6A–6F and 7, a preferred procedure for setting a particular caller's name will be described. FIGS. 6A–6F are plan views showing the switches 11 and display 6 included in the illustrative embodiment.

Figure 6A:
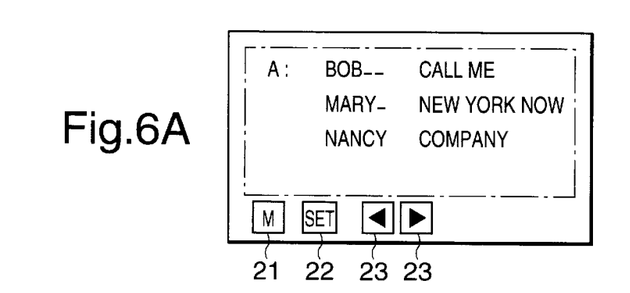
FIGS. 6A–6F show a preferred procedure available with the illustrative embodiment for registering a particular caller's name.
Figure 6B:
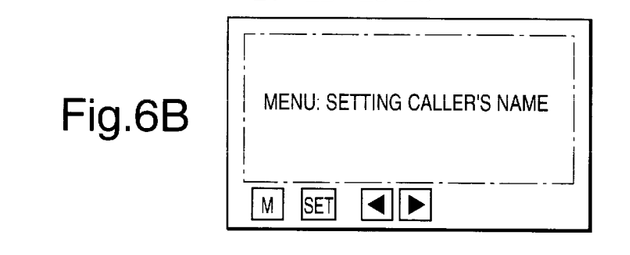

As shown in FIG. 6A, when the pager is in its stand-by state, particular callers' names belonging to a group set by the user on the switches 11 beforehand, e.g., the group A are continuously displayed on the display together with the latest messages respectively corresponding to the callers' names. In this condition, when the user presses an "M" button 21, a menu picture shown in FIG. 6B appears on the display 6. Every time the user presses a "<" button 23 or a ">" button 23 for scrolling while watching the menu picture, items shown in FIG. 7 sequentially appear on the display 6. The user presses a "SET" button 22 when an item "Setting Callers' Name" appears on the display 6. As a result, pictures shown in FIGS. 6C–6E sequentially appear on the display 6 in order to allow the user to set a desired caller's name.

Figure 6C:
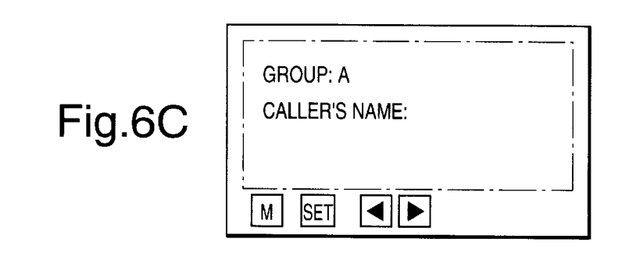

Specifically, in FIG. 6C, the user selects a group name for setting a desired caller's name. In the specific condition shown in FIG. 6C, every time the user presses the "<" or ">" button 23, the group A to the group of maximum number, e.g., the group B sequentially appear on the display 6. The user presses the "SET" button 22 when the group name "A" appears on the display 6. As a result, the group A is set, and the picture is replaced with a name setting picture shown in FIG. 6D. Every time the user watching the picture of FIG.

Figure 6D:
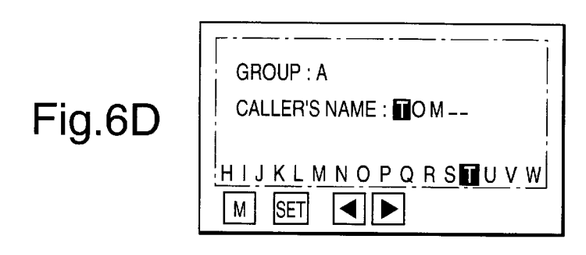

6D presses the "<" or ">" button 23, characters shown in FIG. 2 sequentially appear on the bottom of the display 6 in a preselected order. The user sets a caller's name "TOM" by pressing the "SET" button 22 character by character. FIG. 6D shows a specific condition wherein the user has moved a cursor to the character "T" and then pressed the "SET" button 22. After setting the name "TOM", the user presses the "SET" button 22 for a preselected period of time, e.g., 2 seconds. In response, an end-of-setting picture shown in FIG. 6E appears on the display 6.

Figure 6E:
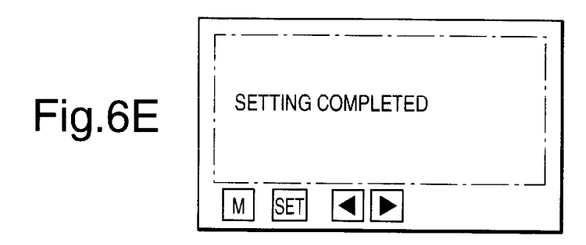
Figure 6F:
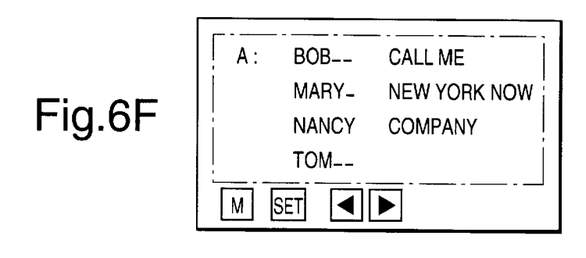
Figure 7:
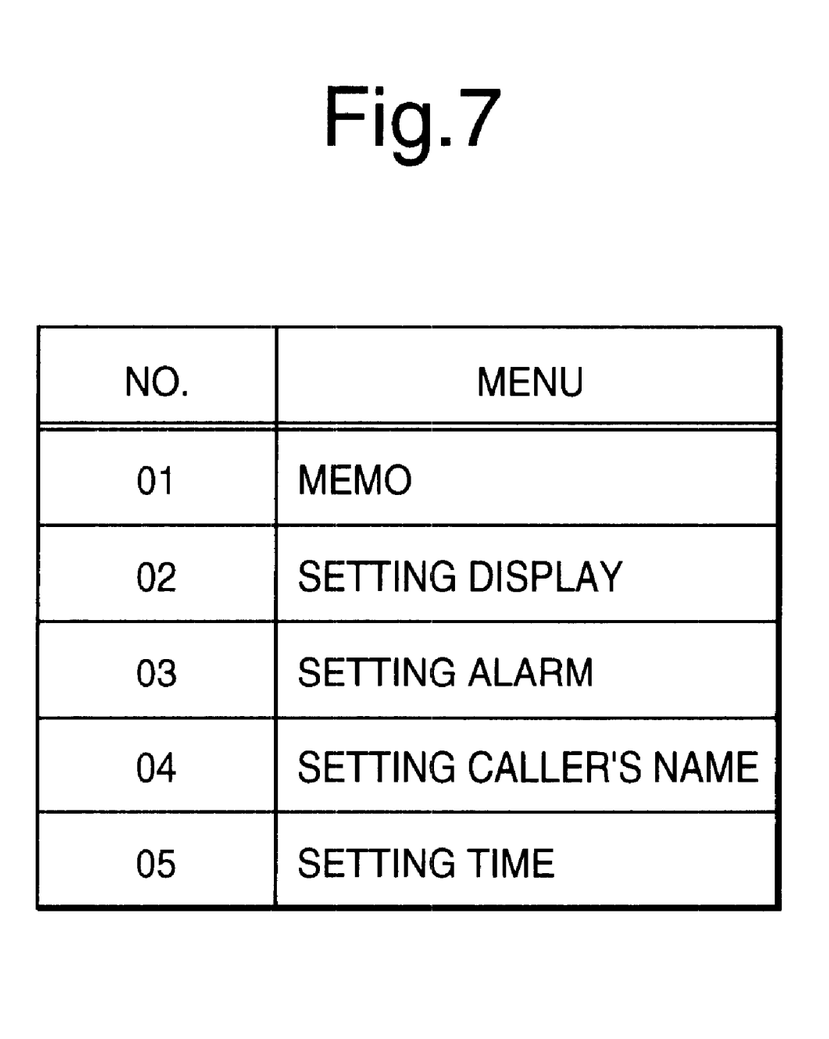
FIG. 7 shows a preferred menu including preselected items.

In FIG. 6E, a message informing the user of the end of setting, e.g., "Setting completed." appears on the display 6. Then, on the elapse of a preselected period of time, e.g., 5 seconds, the end-of-setting display is automatically replaced with a picture shown in FIG. 6F identical with the picture of FIG. 6A except for the new entry of "TOM".

Reference will be made to FIGS. 7 and 8A–8E for describing a preferred procedure for setting a desired group while the pager is in its stand-by state. FIGS. 8A–8E are plan views also showing the switches 11 and display 6 included in the illustrative embodiment.

Figure 8A:
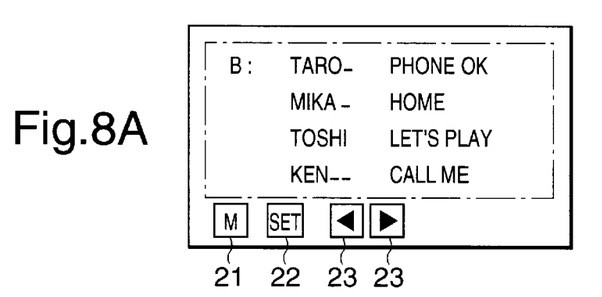
FIGS. 8A–8E show a preferred procedure also available with the illustrative embodiment for registering a display group in the stand-by-state of the apparatus.
Figure 8B:
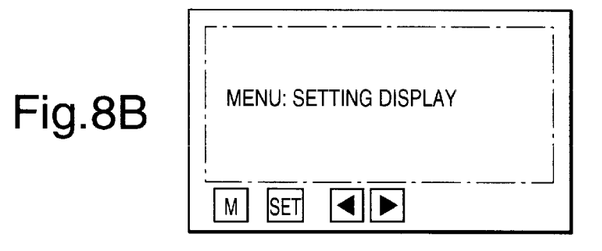

As shown in FIG. 8A, when the pager is in its stand-by state, particular callers' names belonging to a group set beforehand, e.g., the group B are continuously displayed on the display 6 together with the latest messages respectively corresponding to the particular callers' names. In this condition, when the user presses the "M" button 21, a menu picture shown in FIG. 8B appears on the display 6. Every time the user presses the "<" or ">" button 23 while watching the menu picture, the items shown in FIG. 7 sequentially appear on the display 6. The user presses a "SET" button 22 when an item "Setting Display" appears on the display 6. As a result, a display setting picture shown in FIG. 8C appears on the display 6.

Figure 8C:
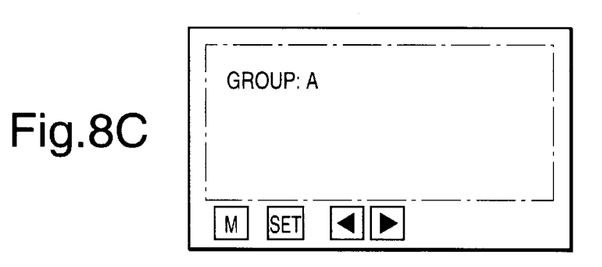

Specifically, in FIG. 8C, the user selects a group name for setting a desired display group. In the specific condition shown in FIG. 8C, every time the user presses the "<" or ">" button 23, the group A to the group of maximum number, e.g., the group C sequentially appear on the display 6. The user presses the "SET" button 22 when the group name "A" appears on the display 6. As a result, the group A is set. Subsequently, when the user presses the "SET" button 22 for a preselected period of time, e.g., 2 seconds, an end-of-setting picture shown in FIG. 8D appears on the display 6.

Figure 8D:
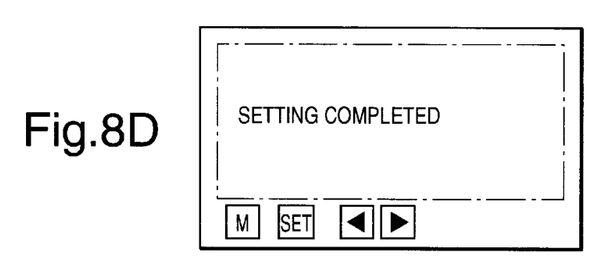
Figure 8E:
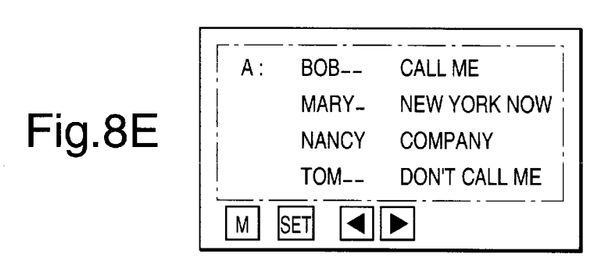

In FIG. 8D, a message informing the user of the end of setting, e.g., "Setting completed" appears on the display 6. Then, on the elapse of a preselected period of time, e.g., 5 seconds, the end-of-setting picture is automatically replaced with a picture shown in FIG. 8E. The picture of FIG. 8E shows the particular callers' names belonging to the newly set group A and the latest messages respectively received from the particular callers and appears continuously thereafter.

In the above embodiment, particular callers' names belonging to a group selected by the user beforehand and the latest messages corresponding thereto are continuously displayed in the stand-by state of the pager. Alternatively, an arrangement may be made such that the callers' names and latest messages are displayed only when the user operates the switches 11.

Figure 9:
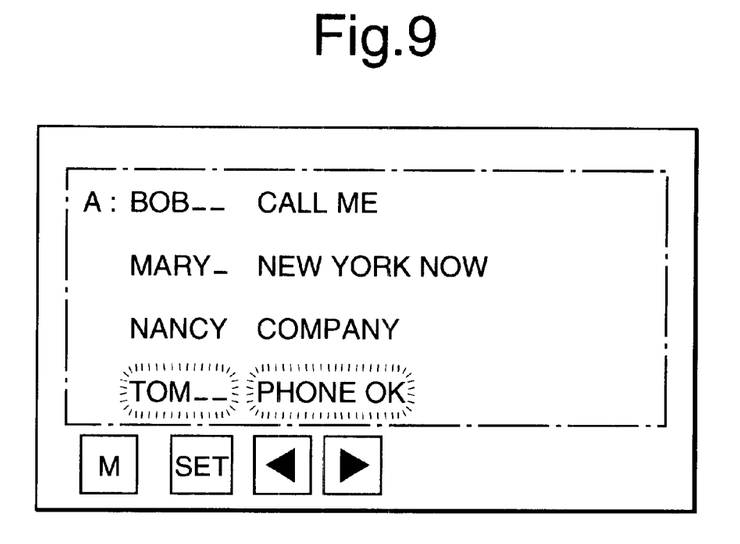
FIGS. 9 and 10 each shows a preferred display of a preferred group number, preferred callers' names, and preferred latest messages at reception time.

As shown in FIG. 9, when any one of the latest messages is updated, one or both of the updated message and particular caller's name corresponding thereto may be caused to blink for a preselected period of time, e.g., 20 seconds. This allows the user to see the updated message surely and rapidly. Blinking may be replaced with sound, if desired.

The crux is that at least one notifying means may be used in addition to the display means.

Figure 10:
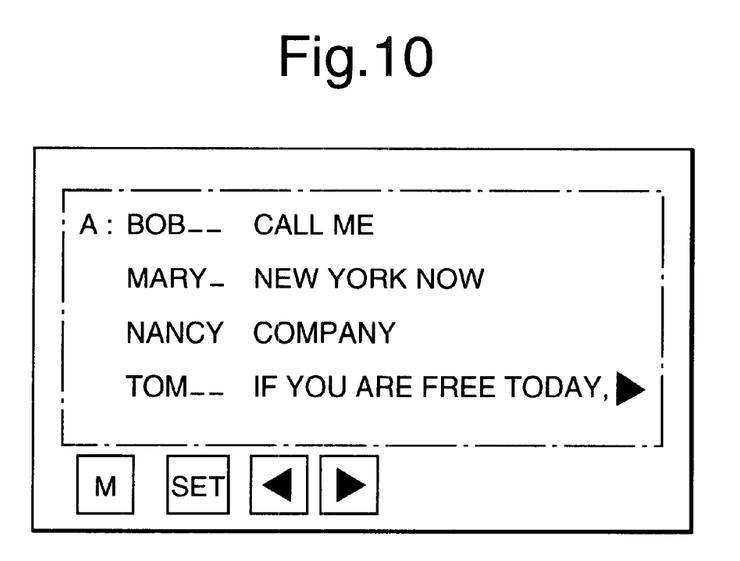

As shown in FIG. 10, when a message received from any particular caller is long, it is preferable that a symbol ">" be displayed in order to show the user that the message continues. In this case, the user should preferably be allowed to see the rest of the message by operating the switches 11. This kind of technology is taught in Japanese laid-open patent application heisei 4-357722 and will not be described specifically in order to avoid redundancy.

It should be noted that number of groups to be registered beforehand the number of particular callers belonging to each group shown and described are not limited in illustration.

While the illustrative embodiment compares a preselected number of characters heading received message data with particular callers' names stored in the storage, a caller's name may be identified on the basis of the intermediate portion or the end portion of message data, if desired. This, however, will force the caller to be aware of a position for inputting the caller's name.

Particular notifying means should preferably be assigned to each of messages received from particular callers stored in the RAM 4 and messages received from the other callers.

Assume that the number of particular callers' names to be set group by group is too great to be displayed together in a single picture. Then, the character font for display may be reduced in size. Alternatively, additional scroll keys may be used in order to allow the user to see all of the particular callers' names and latest messages corresponding thereto. This kind of technology is disclosed in Japanese laid-open patent application heisei 4-56532 and will not be described specifically in order to avoid redundancy.

In summary, it will be seen that the present invention provides a communication apparatus capable of displaying simultaneously the latest messages received from a plurality of particular callers and thereby allowing the user of the apparatus to see situations relating to the individual callers immediately. In addition, the apparatus promotes efficient operation because the user does not have to see the latest messages received from the particular callers one by one.

Obviously, numerous additional modifications and variations of the present invention are possible in light of the above teachings. It is therefore to be understood that within the scope of the appended claims, the invention may be practiced otherwise than as specifically described herein.

What is claimed is:

1. A communication apparatus comprising:

receiving means for receiving a signal including first information representative of a caller's name;

storing means for storing second information representative of a caller's name;

decision means for determining whether or not the first information and the second information are identical; and display means for displaying, when the first information and the second information are identical, said first information and a message included in the signal received, wherein, when said decision means determines said first information is not identical with said second information, said message is displayed alone for a predetermined period of time.

2. A communication apparatus as claimed in claim 1, wherein said display means displays the first information and the message continuously in a stand-by state of said communication apparatus.

3. A communication apparatus as claimed in claim 2, further comprising selecting means for allowing a user of said communication apparatus to select whether or not to display the first information and the message continuously in the stand-by state.

4. A communication apparatus as claimed in claim 1, further comprising switching means for switching call notifying means.

5. A communication apparatus as claimed in claim 1, further comprising setting means for allowing a user of said communication apparatus to set said second information beforehand.

6. A communication apparatus as claimed in claim 1, wherein said communication apparatus comprises a radio selective calling receiver.

7. A communication apparatus comprising:
grouping means for grouping messages respectively received from a plurality of callers; and
display means for displaying the messages grouped by said grouping means in a single picture,
wherein said display means displays a message alone for a preselected period of time, and after said preselected period of time said display means displays said grouped messages.

8. A communication apparatus as claimed in claim 7, further comprising:
receiving means for receiving a signal including information representative of a caller's name; and
storing means for storing a message corresponding to the information.

9. A communication apparatus as claimed in claim 8, wherein said display means displays the messages in one-to-one correspondence to information included in signals received by said receiving means.

10. A communication apparatus as claimed in claim 9, wherein said display means displays a latest one of the messages.

11. A communication apparatus as claimed in claim 10, wherein said display means displays the message continuously in a stand-by state of said communication apparatus.

12. A communication apparatus as claimed in claim 11, further comprising selecting means for allowing a user of said communication apparatus to select whether or not to display the messages continuously in the stand-by state.

13. A communication apparatus as claimed in claim 8, further comprising determining means for determining whether or not the signal includes information identical with any one of the information stored in said storing means.

14. A communication apparatus as claimed in claim 13, wherein the information is present in a particular position of the signal.

15. A communication apparatus as claimed in claim 13, further comprising decision means for determining whether or not the information included in the signal and the information stored in said storing means are identical.

16. A communication apparatus as claimed in claim 15, wherein said storing means updates, when the information received and the information stored are identical, a message corresponding to the information stored.

17. A communication apparatus as claimed in claim 15, wherein said display means displays, when the information received and the information stored are identical, a message updated.

18. A communication apparatus as claimed in claim 17, wherein said display means causes the message updated to blink.

19. A communication apparatus as claimed in claim 15, further comprising switching means for switching a call notifying method on the basis of a result of decision output from said decision means.

20. A communication apparatus as claimed in claim 8, further comprising setting means for allowing a user of said communication apparatus to set information representative of the caller's name beforehand.

21. A communication apparatus as claimed in claim 7, wherein said communication apparatus comprises a radio selective calling receiver.

22. A communication apparatus comprising:
a receiving section for receiving first information representative of a caller's name and a message following said first information;
a storage section for storing second information representative of a caller's name;
a comparison and control section for determining whether or not the first information and the second information are identical; and
a display for displaying, when the first information and the second information are identical, said first information and a message included in the signal received,
wherein, when said comparison and control section determines said first information is not identical with said second information, said message is displayed alone for a predetermined period of time.

23. A communication apparatus comprising:
a controller for grouping messages respectively received from a plurality of callers; and
a display for displaying the messages grouped by said controller in a single picture,
wherein said display displays a message alone for a preselected period of time, and after said preselected period of time said display displays said grouped messages.

24. A display method for a communication apparatus comprising:
(a) setting first information representative of a caller's name;
(b) receiving a signal including second information representative of a caller's name;
(c) determining whether or not the first information and the second information are identical; and
(d) displaying, when the first information and the second information are identical, said second information and a message included in the signal received,
wherein, when said determining determines said first information is not identical with said second information, said message is displayed alone for a predetermined period of time.

25. A display method as claimed in claim 24, wherein said determining comprises comparing the first information and a preselected portion of the signal received.

26. A display method for a communication apparatus, comprising:
(a) setting first information representative of a caller's name;
(b) grouping and storing a plurality of the first information;
(c) receiving a signal including second information representative of a caller's name;
(d) determining whether or not the second information and any one of the first information are identical; and (e) displaying, when the second information and any first information are identical, a plurality of first information and messages respectively corresponding to the plurality of first information in a single picture, wherein, when said determining determines said first information is not identical with said second information, said message is displayed alone for a predetermined period of time.

27. A display method as claimed in claim 26, wherein grouping comprises storing a plurality of the first information grouped and messages respectively corresponding to said first information.

28. A display method as claimed in claim 27, further comprising, (f) updating, when the first information and the second information are identical, the message stored.

29. A display method as claimed in claim 26, wherein said displaying comprises displaying the plurality of first information and the messages continuously in a standby state of said communication apparatus.

30. The communication apparatus, as claimed in claim 1, wherein said second information comprises information about a relationship of said caller to at least one other caller having their information stored in said storing means.

31. The communication apparatus, as claimed in claim 15, wherein, when said decision means determines said information included in said signal is not identical with said information stored, said message is displayed alone for a predetermined period of time and wherein said information stored comprises information about a relationship of said caller to at least one other caller having their information stored in said storing means.

32. The communication apparatus, as claimed in claim 22, wherein said second information comprises information about a relationship of said caller to at least one other caller having their information stored in said storage section.

33. The communication apparatus, as claimed in claim 23, wherein said controller determines a message can be grouped using information provided with said message and stored information about a relationship of said caller to at least one other caller having their information stored.

34. The display method, as claimed in claim 24, wherein said first information comprises information about a relationship of said caller to at least one other caller having their information stored.

35. The display method, as claimed in claim 26, wherein said first information comprises information about a relationship of said caller to at least one other caller having their information stored.

* * * * *